Jan. 8, 1952   D. TOM-PETERSEN   2,581,890
LONGITUDINAL AND TRANSVERSAL BULKHEADS IN SHIPS
Filed Feb. 28, 1948
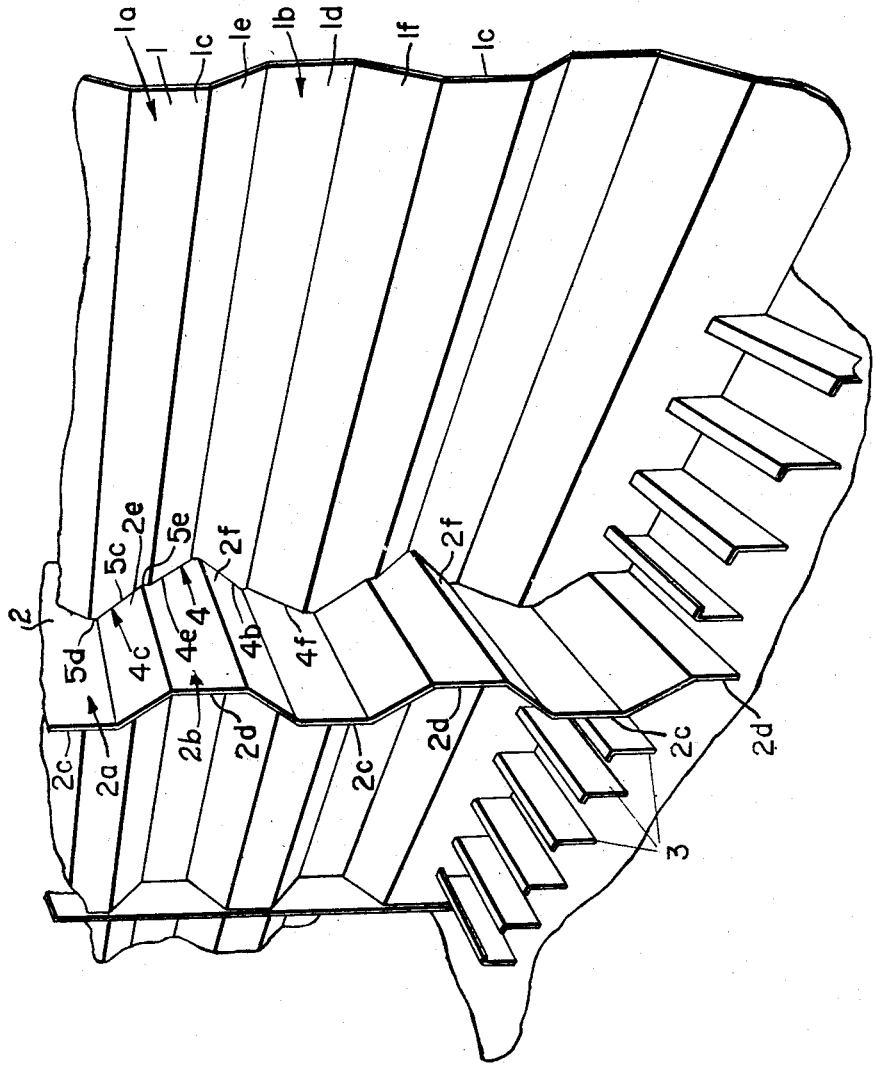
INVENTOR:
Ditlev Tom-Petersen
BY
his Agent.

Patented Jan. 8, 1952

2,581,890

UNITED STATES PATENT OFFICE 2,581,890

LONGITUDINAL AND TRANSVERSAL BULKHEADS IN SHIPS

Ditlev Tom-Petersen, Odense, Denmark

Application February 28, 1948, Serial No. 12,028
In Denmark February 11, 1947

Section 1, Public Law 690, August 8, 1946
Patent expires February 11, 1967

1 Claim. (Cl. 114—78)

The present invention relates to bulkhead structure for ships and has as its main object to provide an arrangement of intersecting bulkheads which can be joined by welding, and in which the welding can be facilitated.

In bulkhead intersections with flutes or corrugated bulkhead plates the welding of a continuous joint along the intersection line presents difficulties, because the welding must be effected in certain places in the bottom of a relatively small angle between the two intersecting plates.

Another problem is that the acute angles will make it necessary to bevel the edges of one bulkhead plate where it abuts the other bulkhead plate under such acute angles. This bevelling demands careful adjustment.

In accordance with these problems it is a further object of the invention to provide a bulkhead intersection in which flutes bulkhead plates will always be mutually perpendicular throughout the entire extension of the intersecting line between the two bulkheads, so that the bevelling and adjustment can be avoided and the welding lines always be easily accessible.

Therefore still a further object of the invention is to provide a bulkhead intersection which is cheaper in construction.

In order to make the invention readily understood I refer to the definition in the appended claim and the following specification in connection with the drawing, which shows a perspective view of a bulkhead intersection in accordance with the invention.

In the drawing 1 is a transversal bulkhead and 2 is a longitudinal bulkhead. 3 are longitudinal frames.

The bulkheads 1 and 2 consist of corrugated plate with horizontal flutes or corrugations.

The bulkhead 2 is provided with horizontally extending uniform flutes generally referred to as 2a and 2b, respectively, including lateral walls 2c which lie in the same vertical plane, and lateral walls 2d which also lie in a vertical plane spaced from and parallel with the plane of the lateral walls 2c. The lateral walls are connected by top walls and bottom walls 2e and 2f, respectively. Hereby the distance between adjacent edges of adjacent lateral walls 2c or 2d, respectively, is about twice the height of said walls. The other bulkhead generally referred to as 1 has in similar way horizontally extending flutes 1a and 1b including lateral walls 1c and 1d lying in spaced parallel vertical planes and joined by top- and bottom walls 1e and 1f at internal angles greater than 90° to the side walls.

The two bulkheads are arranged perpendicular to each other. In the drawing the longitudinal bulkhead is supposed to be throughgoing and the transversal bulkhead joined thereto from opposite sides.

To effect a continuous joint, the lateral left hand edge, generally referred to as 4, of the bulkhead plate 1 is profiled to interfit with the flutes of the plate 2.

As shown in the drawing, the flutes of the two bulkhead plates do not lie between common horizontal plates, but are arranged displaced in vertical direction in such a manner that lateral wall portions in one bulkhead plate intersect an inclined top- and bottom wall portion, respectively, in the other bulkhead plate. Hereby is obtained that the two parts will always intersect each other at right angles along the whole intersecting line between the two bulkheads.

In the drawing, for instance, the edge portion 4e at the left hand side of the top wall 1e is butted against the vertical side wall portion 2b. Since this side wall portion is vertical, the wall portion 1e is perpendicular to the surface of the sidewall portion 2b and the welding can take place without obstructions at both sides. The edge 4b at the left hand side of the side wall portion 1b is butted against the inclined bottom wall portions 2f of the bulkhead 2. Here, again the sidewall portion 1b is along this part of the intersection line perpendicular to the sloping wall portion 2f and also here the welding can take place from both sides in a right-angled intersection. Further down the left hand edge 4f of the sloping bottom wall portion 1f is butted against the vertical side wall portion 2c of the bulkhead 2, again giving right angles for the welding on both sides of the bulkhead 1.

Everywhere the displacement of the flutes in the two bulkhead plates is so arranged that a bottom wall portion or a top wall portion of one bulkhead and lateral side wall portions of the other bulkhead lie substantially between parallel planes.

As shown the extension of the vertical parts in vertical direction may be slightly greater than the vertical extension of the sloping parts. Hereby is obtained that the vertical parts in the two bulkheads will intersect each other along short lines in the neighborhood of their upper and lower extension, but also these intersections will be at right angles to each other.

In the drawing thus, for instance, the height of the side wall portion 1c is slightly greater than the sloping top wall portion 2e. Hereby the left hand side edge, generally referred to as 4c, will not be a straight line but a broken line with one edge portion 5c butting against the top wall portion 2e and at each end short edge portions 5d and 5e butting against the lateral side walls 2c and 2d, respectively.

Since the lateral side wall portion 1a as well as the lateral side wall portions 2c and 2d are vertical, the intersection along the short lines 5d and 5e will also be at right angles to each other.

The rule of extending the vertical side wall portions slightly greater than the sloping portions is advantageous, because hereby it is definitely assured that sloping top- and bottom wall portions will never be able to intersect each other and thereby form acute angles, in which the welding will be difficult. The welding on both sides of the intersection line described provides a continuous joint along the whole intersection line.

I claim:

Bulkhead structure for ships comprising an upright bulkhead-plate having horizontal flutes including vertical and inclined portions, a second upright bulkhead-plate having horizontal flutes including vertical and inclined portions and having an edge profiled as the flutes of, and butted against, said first bulkhead-plate with said edge interfitted with the flutes thereof, said second bulkhead-plate disposed at right angles to the first bulkhead-plate and joined thereto by a welded continuous joint along said edge, successive flutes of said bulkhead-plates lying displaced between different horizontal planes in such a manner that vertical portions of the flutes in one bulkhead-plate throughout intersect the oblique portions of the flutes in the other bulkhead-plate at right angles, whereby all intersecting surfaces are perpendicular to each other.

DITLEV TOM-PETERSEN.

REFERENCES CITED

The following references are of record in the file of this patent:

UNITED STATES PATENTS

| Number | Name | Date |
|---|---|---|
| 2,362,226 | Weaver | Nov. 7, 1944 |